US008306349B2

(12) United States Patent
Liu

(10) Patent No.: US 8,306,349 B2
(45) Date of Patent: Nov. 6, 2012

(54) METHOD FOR SIMULATING DARK-PART EXPOSURE COMPENSATION OF HIGH DYNAMIC RANGE IMAGES USING A SINGLE IMAGE AND IMAGE PROCESSING DEVICE FOR USE WITH THE METHOD

(75) Inventor: Yung-Chiu Liu, Jung-Ho (TW)

(73) Assignee: MSI Computer(Shenzhen) Co., Ltd, Guangdong Province (CN)

( * ) Notice: Subject to any disclaimer, the term of this patent is extended or adjusted under 35 U.S.C. 154(b) by 737 days.

(21) Appl. No.: 12/534,636

(22) Filed: Aug. 3, 2009

(65) Prior Publication Data
US 2010/0232726 A1    Sep. 16, 2010

(30) Foreign Application Priority Data

Mar. 13, 2009    (TW) ................................ 98108128 A

(51) Int. Cl.
*G06K 9/40* (2006.01)
(52) U.S. Cl. ......... 382/254; 382/264; 382/274; 382/294
(58) Field of Classification Search .................. 348/603, 348/645, 703, E5.034, E5.035, E5.119; 382/254, 382/264, 274, 294
See application file for complete search history.

(56) References Cited

U.S. PATENT DOCUMENTS

2009/0274364 A1*  11/2009  Shakya et al. ................. 382/165
2011/0123133 A1*   5/2011  Mohanty et al. .............. 382/274

* cited by examiner

*Primary Examiner* — Gregory F Cunningham
(74) *Attorney, Agent, or Firm* — Ming Chow; Sinorica, LLC

(57) ABSTRACT

A method for simulating dark-part exposure compensation of high dynamic range images using a single image includes steps of: performing bright-part-enhancing image processing and saturation-contrast-enhancing image processing to obtain images P1, P2, respectively; selecting one of the images P1, P2; performing bright and dark parts identifying image processing on a selected image; performing blurring image processing on the selected image, to obtain a weight-reference image P3; and performing mixed weight calculation on pixels of the image P1 and pixels of the image P2 according to weights of pixels of the weight-reference image P3, respectively, so as to mix the image P1 and the image P2 to obtain a mixed image P4, wherein the pixels of the images P1, P2 on which the mixed weight calculation is performed correspond to the pixels of the weight-reference image P3, respectively. Hence, excessively dark parts typical of an image of undesirably high contrast are improved by reference to a single.

18 Claims, 9 Drawing Sheets

METHOD FOR SIMULATING DARK-PART EXPOSURE COMPENSATION OF HIGH DYNAMIC RANGE IMAGES USING A SINGLE IMAGE AND IMAGE PROCESSING DEVICE FOR USE WITH THE METHOD

CROSS-REFERENCES TO RELATED APPLICATIONS

This non-provisional application claims priority under 35 U.S.C. §119(a) on Patent Application No. 098108128 filed in Taiwan, R.O.C. on Mar. 13, 2009 the entire contents of which are hereby incorporated by reference.

FIELD OF THE INVENTION

The present invention relates to image processing, and more particularly, to image processing configuration for simulation of dark-part exposure compensation of high dynamic range images using a single image.

BACKGROUND OF THE INVENTION

Conventional methods for taking high dynamic range images are useful in improving excessive dark parts of an image of undesirably high contrast. However, the conventional methods for taking high dynamic range images entail taking images at different exposure levels before combining the images according to different brightness levels so as to obtain a perfect image. However, the conventional methods have their own drawbacks. Plenty images of the same scene have to be taken of in advance. It is rather difficult to take pictures of the same image at the same scene but at different exposure levels without a tool for holding a camera, such as a camera tripod, not to mention that it is a waste of storage space to store on memory plenty of pictures taken of the same image.

US 2006/0,061,845, entitled Image Composition System and Method, disclosed a system of composing images taken at different exposure levels. The image composition system comprises an image detection unit and an image composition unit. The image detection unit detects marked parts in low dynamic range images. The low dynamic range images are images of the same scene taken at different exposure levels. The image composition unit sets exposure history data of the low dynamic range images according to the marked parts. The image composition unit then synthesizes the low dynamic range images into a high dynamic range image according to the exposure history data. However, the image composition system and method disclosed in US 2006/0,061,845 has its own drawbacks, that is, it is rather difficult to take pictures of the same image at the same scene but at different exposure levels, not to mention that it is a waste of storage space to store on memory plenty of pictures taken of the same image.

The inventor of the present invention realized the drawbacks of the prior art and endeavored to overcome the drawbacks by inventing a method for simulating dark-part exposure compensation of high dynamic range images using a single image and an image processing device for use with the method, wherein excessive dark parts of an image of undesirably high contrast are improved by reference to a single image.

SUMMARY OF THE INVENTION

It is a first objective of the present invention to provide a method for simulating dark-part exposure compensation of high dynamic range images using a single image, wherein excessive dark parts of an image of undesirably high contrast are improved by reference to a single image.

A second objective of the present invention is to provide an image processing device for use with the method for simulating dark-part exposure compensation of high dynamic range images using a single image, wherein excessive dark parts of an image of undesirably high contrast are improved by reference to a single image.

To achieve the first objective of the present invention, the present invention provides a method for simulating dark-part exposure compensation of high dynamic range images using a single image, comprising the steps of: obtaining an image P0; performing bright-part-enhancing image processing on the image P0 to obtain an image P1 and further performing saturation-contrast-enhancing image processing on the image P0 to obtain an image P2; selecting one of the image P1 and the image P2, performing bright and dark parts identifying image processing on the selected image selected from the image P1 and the image P2, performing blurring image processing on the selected image, so as to obtain a weight-reference image P3, wherein each of a plurality of pixel values of the weight-reference image P3 represents a weight; and performing mixed weight calculation on a plurality of pixels of the image P1 and a plurality of pixels of the image P2 according to a plurality of weights of a plurality of pixels of the weight-reference image P3, respectively, so as to mix the image P1 and the image P2 to obtain a mixed image P4, wherein the pixels of the images P1, P2 on which the mixed weight calculation is performed correspond to the pixels of the weight-reference image P3, respectively.

To achieve the second objective of the present invention, the present invention provides an image processing device, comprising: a first device for obtaining an image P0; a second device for performing bright-part-enhancing image processing on the image P0 to obtain an image P1 and performing saturation-contrast-enhancing image processing on the image P0 to obtain an image P2; a third device for selecting one of the image P1 and the image P2, performing bright and dark parts identifying image processing on a selected image selected from the image P1 and the image P2, performing blurring image processing on the selected image, so as to obtain a weight-reference image P3, wherein each of a plurality of pixel values of the weight-reference image P3 represents a weight; and a fourth device for performing mixed weight calculation on a plurality of pixels of the image P1 and a plurality of pixels of the image P2 according to a plurality of weights of a plurality of pixels of the weight-reference image P3, respectively, so as to mix the image P1 and the image P2 to obtain a mixed image P4, wherein the pixels of the images P1, P2 on which the mixed weight calculation is performed correspond to the pixels of the weight-reference image P3, respectively.

Also, to achieve the second objective of the present invention, the present invention further provides an image processing device, comprising: a memory for at least storing an image P0; and a processor for performing image processing comprising steps of: performing bright-part-enhancing image processing on the image P0 to obtain an image P1 and performing saturation-contrast-enhancing image processing on the image P0 to obtain an image P2; selecting one of the image P1 and the image P2, performing bright and dark parts identifying image processing on a selected image selected from the image P1 and the image P2, performing blurring image processing on the selected image, so as to obtain a weight-reference image P3, wherein each of a plurality of pixel values of the weight-reference image P3 represents a weight; and performing mixed weight calculation on a plurality of pixels of the image P1 and a plurality of pixels of the image P2 according to a plurality of weights of a plurality of pixels of the weight-reference image P3, respectively, so as to mix the image P1 and the image P2 to obtain a mixed image P4, wherein the pixels of the images P1, P2 on which the mixed weight calculation is performed correspond to the pixels of the weight-reference image P3, respectively.

BRIEF DESCRIPTION OF THE DRAWINGS

To enable persons skilled in the art to gain insight into the structures, features, and effects of use of the present invention, the present invention is hereunder illustrated with preferred embodiments in conjunction with the accompanying drawings, wherein.

DETAILED DESCRIPTION OF THE INVENTION

Figure 1:
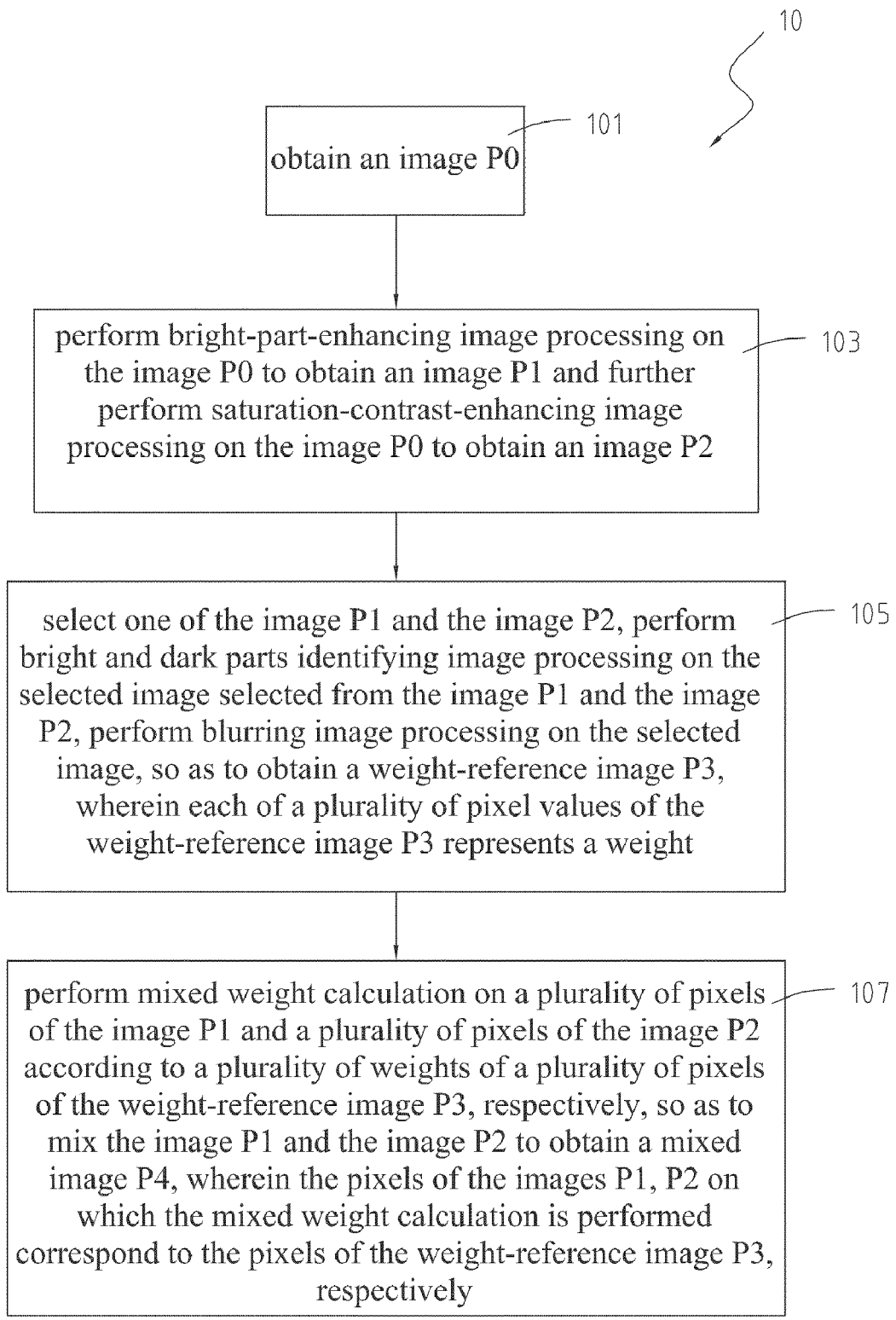
FIG. 1 is a flowchart of a method for simulating dark-part exposure compensation of high dynamic range images using a single image according to the present invention.
Figure 2:
FIG. 2 shows an exemplary embodiment of an original image before undergoing dark-part exposure compensation achieved by the method of the present invention.
Figure 3:
FIG. 3 shows an exemplary embodiment of the original image in FIG. 2 after undergoing dark-part exposure compensation achieved by the method of the present invention.

Primary features of the present invention are as follows: processing a single image (such as a picture of undesirably high contrast) to obtain two images of different levels of exposure; and performing special image composition processing on the two images to obtain a mixed image such that the mixed image retains details of bright parts and dark parts of the single image. FIG. 1 is a flowchart of a method for simulating dark-part exposure compensation of high dynamic range images using a single image according to the present invention. FIG. 2 shows an exemplary embodiment of an original image before undergoing dark-part exposure compensation achieved by the method of the present invention. FIG. 3 shows an exemplary embodiment of the original image in FIG. 2 after undergoing dark-part exposure compensation achieved by the method of the present invention. The present invention provides a method 10 for simulating dark-part exposure compensation of high dynamic range images using a single image, comprising Steps 101-107 as follows.

Step 101 involves obtaining an image P0. An exemplary embodiment of a source of the image P0 of Step 101 is a digital camera, a mobile phone with camera, a personal digital assistant (PDA) with camera, a multimedia playing device with camera, or any electronic device with camera. FIG. 2 shows an exemplary embodiment of the image P0. The image shown in FIG. 2 is a picture of undesirably high contrast, which features unclear, inconspicuous details of elements of the picture, such as a house and plants, except the sky.

Step 103 involves performing bright-part-enhancing image processing on the image P0 to obtain an image P1 and further performing saturation-contrast-enhancing image processing on the image P0 to obtain an image P2. A preferred embodiment of the bright-part-enhancing image processing in Step 103 is described hereunder. The bright-part-enhancing image processing is expressed by equation (1) as follows:

$$F(x) = \frac{\log\left(1.0 + \frac{x \div 255}{\Delta \varepsilon}\right)}{\log\left(1.0 + \frac{1.0}{\Delta \varepsilon}\right)} \times 255$$

where parameter x in F(x) denotes pixel values of the image P0 and ranges between 0 and 255, and $\Delta \varepsilon$ denotes a constant and ranges between 0.001 and 0.1.

Figure 4:
FIG. 4 shows an exemplary embodiment of an image after undergoing an intermediary step of bright-part-enhancing image processing according to the present invention.

Equation (1) expresses application of variations in logarithmic relations to issues of tone mapping. Equation (1) enables dark parts of an image to be mapped to the visual field of normal human eyes. FIG. 4 shows an exemplary embodiment of the image P1 obtained by performing an intermediary step of bright-part-enhancing image processing on the image P0 according to the present invention.

In case of an electronic device, equation (1) can be implemented in the form of table lookup. Given 0<=x<=255 and 0<=F (x)<=255, an one-dimensional array can substitute for equation (1). After a pixel values x has been entered during the bright-part-enhancing image processing, a corresponding bright-part-enhanced image is quickly obtained by table lookup.

Figure 5:
FIG. 5 shows an exemplary embodiment of an image after undergoing an intermediary step of saturation-contrast-enhancing image processing according to the present invention.

In Step 103, saturation-contrast-enhancing image processing is expressed by equation (2) as follows:

$$F(x)_{black\_enh} = x^{bias(x)*a}$$
$$\text{where } bias(x) = x^{\frac{\log(b)}{\log 0.5}}$$

a ranges between 4.0 and 6.0, and b ranges between 0.04 and 0.06 where parameter x denotes pixel values of the image P0 and ranges between 0 and 255. The function bias(x) resets x to a larger or smaller value. As x increases, bias(x) increases, but F(x) in equation (2) decreases, thereby enhancing saturation and contrast of the image. FIG. 5 shows an exemplary embodiment of the image P2 obtained by performing an intermediary step of saturation-contrast-enhancing image processing on the image P0 according to the present invention.

Figure 6:
FIG. 6 shows an exemplary embodiment of an image after undergoing an intermediary step of bright and dark parts identifying image processing according to the present invention.

Step 105 involves selecting one of the image P1 and the image P2, performing bright and dark parts identifying image processing on the selected image selected from the image P1 and the image P2, performing blurring image processing on the selected image, so as to obtain a weight-reference image P3, wherein each of a plurality of pixel values of the weight-reference image P3 represents a weight. A preferred embodiment of the bright and dark parts identifying image processing in Step 105 is described hereunder. The bright and dark parts identifying image processing is expressed by equation (3) as follows:

$$F(x)=ax^3+bx^2+cx+d$$

where parameter x denotes pixel values of the selected image (the image P1 or the image P2) and ranges between 0 and 255, where a, b, c and d are coefficients, where the F(x) in equation (3) ranges between 0 and 255. FIG. 6 shows an exemplary embodiment of the image P2 after undergoing an intermediary step of bright and dark parts identifying image processing according to the present invention.

F(x) in equation (3) is graphically represented by a curve that passes (0, 0), (23, 41), (56, 218), and (255, 255). Then, F(x) in equation (3) is factorized as follows:

$$F(x)=a(x-x1)(x-x2)(x-x3)+b(x-x1)(x-x2)(x-x4)+c(x-x1)(x-x3)(x-x4)+d(x-x2)(x-x3)(x-x4)$$

then, a, b, c, and d are solved.

In case of an electronic device, equation (3) can be implemented in the form of table lookup. Given 0<=x<=255 and 0<=F(x)<=255, an one-dimensional array can substitute for F(x) in equation (3). After a pixel values x has been entered during the bright and dark parts identifying image processing, a corresponding bright and dark parts identified image is quickly obtained by table lookup.

A preferred embodiment of the blurring image processing in Step 105 is described hereunder. The blurring image processing is Gaussian blurring image processing. Gaussian blur is an image blurring filter for calculating a change in each of the pixels of an image by normal distribution-based analysis. N-dimensional normal distribution equation is as follows:

$$G(r) = \frac{1}{\sqrt{2\pi\sigma^2}^N} e^{-r^2/(2\sigma^2)}$$

Figure 7:
FIG. 7 shows an exemplary embodiment of the temporary image in FIG. 6 after undergoing an intermediary step of blurring image processing according to the present invention.

Two-dimensional normal distribution equation is as follows:

$$G(u, v) = \frac{1}{2\pi\sigma^2} e^{-(u^2+v^2)/(2\sigma^2)}$$

where r denotes blur radius ($r^2=u^2+v^2$), and σ denotes standard deviation of normal distribution. From a two-dimensional perspective, contour lines on the curved surface graphically represented by the aforesaid equation are concentric circles that demonstrate normal distribution from the centers of the concentric circles. Transformation between the original image and a matrix convolution composed of pixels of non-zero distribution takes place. The value of each pixel is the weighted average of the values of surrounding pixels. The value of the original pixel is the maximum value in Gaussian distribution and therefore has the greatest weight. The farther a surrounding pixel is away from the original pixel, the less is the weight of the surrounding pixel. Blur processing performed in the aforesaid manner retains the margin effect better than other balanced blurring filters. FIG. 7 shows the image P3, an exemplary embodiment of the temporary image in FIG. 6, after undergoing an intermediary step of blurring image processing according to the present invention.

Step 107 involves performing mixed weight calculation on a plurality of pixels of the image P1 and a plurality of pixels of the image P2 according to a plurality of weights of a plurality of pixels of the weight-reference image P3, respectively, so as to mix the image P1 and the image P2 to obtain a mixed image P4, wherein the pixels of the images P1, P2 on which the mixed weight calculation is performed correspond to the pixels of the weight-reference image P3, respectively. A preferred embodiment of the mixing image processing for mixed weight calculation in Step 107 is described hereunder. The mixing image processing of the present invention can be implemented by the prior art, such as Alpha blending. Images are depicted in the three primary colors, namely, R (red), G (green), and B (blue). Assuming an image is denoted by A and another image by B, watching image A through image B results in image C which is a mixed image obtained by mixing image B and image A. The equation for Alpha blending is as follows:

$$R(C)=alpha*R(B)+(1-alpha)*R(A)$$

$$G(C)=alpha*G(B)+(1-alpha)*G(A)$$

$$B(C)=alpha*B(B)+(1-alpha)*B(A)$$

where transparency of image B is denoted by alpha, 0<=alpha<=1, the value 0 denotes "full transparency", and the value 1 denotes "not transparent".

Referring to FIG. 3, an exemplary image is shown, wherein the Alpha mixed weight calculation is performed according to the weight-reference image P3, so as to mix the image P1 and the image P2 to obtain the mixed image P4.

The present invention provides a method for simulating high dynamic range images using a single image, including: compensating dark parts of a single image by bright parts enhancement algorithm, enhancing colors of the original bright parts by saturation and contrast enhancement algorithm to facilitate multiple exposure during simulation of high dynamic range images, determining weights for mixing images in simulation of high dynamic range images by bright-part-identifying algorithm, performing blurring processing on the weights obtained by the bright-part-identifying algorithm so as to render the mixed image natural to human eyes, thereby obtaining a complete image with enhanced bright and dark parts. The present invention has a wide variety of applications, such as figures in backlighting, direct sunlight photography, taking pictures with a strong single light source, taking pictures in a dim environment, and face recognition, so as to mitigate the adverse effect of an inadequate or unpleasant light source and augment recognition rates.

Figure 8:
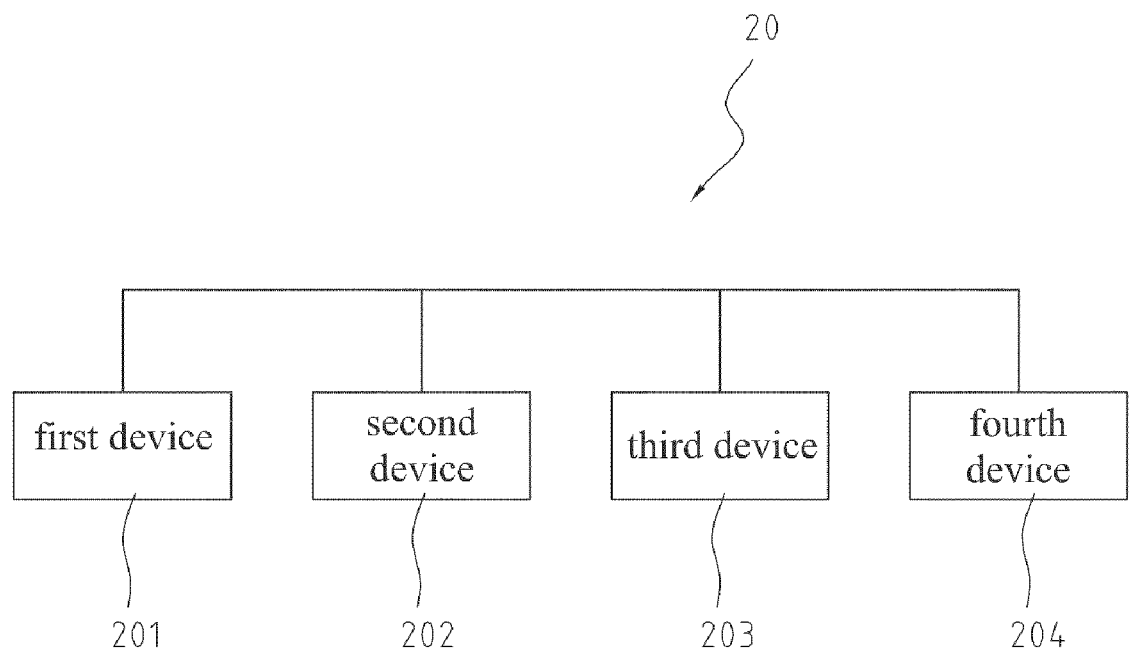
FIG. 8 is a schematic view of a preferred embodiment of the framework of an image processing device for use with the method of the present invention.

In addition, the present invention discloses an image processing device 20 for use with the method 10 of the present invention. Referring to FIG. 8, which is a schematic view of a preferred embodiment of the framework of the image processing device 20 for use with the method of the present invention, the image processing device 20 comprises a first device 201, a second device 202, a third device 203, and a fourth device 204. The above-mentioned are described in detail hereunder.

The first device 201 obtains the image P0. In a preferred embodiment, the first device 201 is implemented by the prior art of image sensing devices, such as charge-coupled device (CCD) or CMOS image sensors. In another preferred embodiment, the first device 201 is implemented by the prior art of communication ports, such as known USB communication ports, and thus the image P0 is obtained via USB communication ports.

The second device 202 performs bright-part-enhancing image processing on the image P0 to obtain an image P1 and further performs saturation-contrast-enhancing image processing on the image P0 to obtain an image P2. The third device 203 selects one of the image P1 and the image P2, performs bright and dark parts identifying image processing on the selected image selected from the image P1 and the image P2, performs blurring image processing on the selected image, so as to obtain a weight-reference image P3, wherein each of a plurality of pixel values of the weight-reference image P3 represents a weight. The fourth device 204 performs mixed weight calculation on a plurality of pixels of the image P1 and a plurality of pixels of the image P2 according to a plurality of weights of a plurality of pixels of the weight-reference image P3, respectively, so as to mix the image P1 and the image P2 to obtain a mixed image P4, wherein the pixels of the images P1, P2 on which the mixed weight calculation is performed correspond to the pixels of the weight-reference image P3, respectively.

Figure 9:
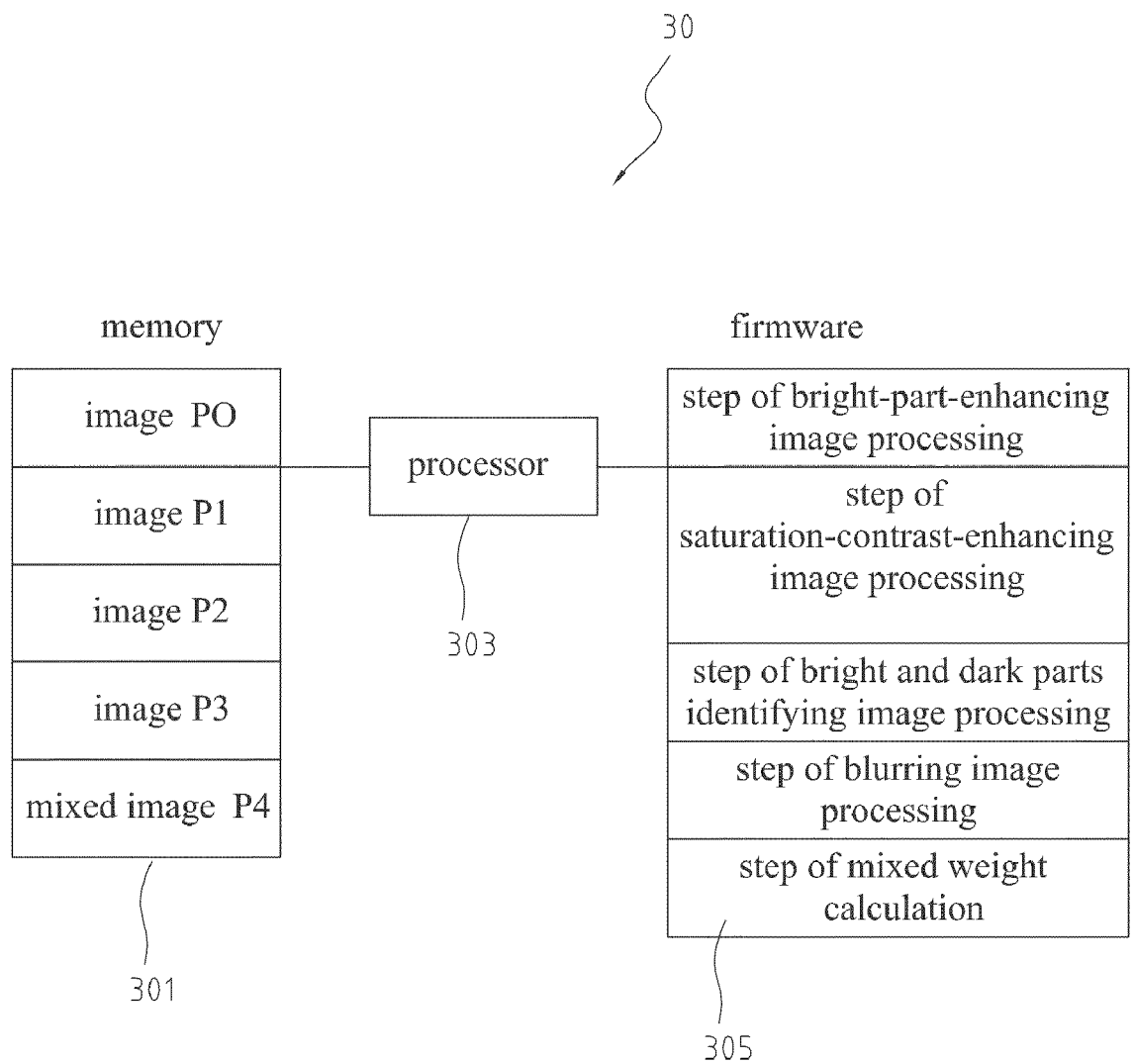
FIG. 9 is a schematic view of another preferred embodiment of the framework of another image processing device for use with the method of the present invention.

In addition, the present invention discloses an image processing device 30 for use with the method 10 of the present invention. Referring to FIG. 9, which is a schematic view of another preferred embodiment of the framework of an image processing device 30 for use with the method of the present invention, the image processing device 30 comprises a memory 301 and a processor 303 which are described as follows.

At least the images P0, P1, P2 and P3 and the mixed image P4 are stored in the memory 301.

The processor 303 performs image processing comprising the steps as follows. In the step of bright-part-enhancing image processing, bright parts of the image P0 are enhanced so as to obtain the image P1. In the step of saturation-contrast-enhancing image processing, saturation and contrast of the image P0 are enhanced, so as to obtain the image P2. In the step of bright and dark parts identifying image processing, one of the image P1 and the image P2 is selected, and then bright parts and dark parts of the selected image are identified. In the step of blurring image processing, the image is blurred, so as to obtain the weight-reference image P3, wherein each of the pixel values of the weight-reference image P3 represents a weight. In the step of mixed weight calculation, mixed weight calculation is performed on a plurality of pixels of the image P1 and a plurality of pixels of the image P2 according to a plurality of weights of a plurality of pixels of the weight-reference image P3, respectively, so as to mix the image P1 and the image P2 to obtain the mixed image P4, wherein the pixels of the images P1, P2 on which the mixed weight calculation is performed correspond to the pixels of the weight-reference image P3, respectively.

The above image processing steps can be performed in the presence of a firmware 305 of the image processing device 30.

In a preferred embodiment, the image processing devices 20, 30 are digital cameras, mobile phones with camera, personal digital assistants (PDA) with camera, multimedia playing devices with camera, or any electronic devices with camera.

Unlike conventional methods for processing high dynamic range images, which entail taking pictures of the same image at the same scene in order to further improve the processing of the image, the present invention discloses improving excessively dark parts typical of an image of undesirably high contrast by reference to a single image, so as to save memory space which is otherwise occupied by temporary images stored therein and provide ease of use of a method of photography disclosed in the present invention—the advantages and effects of the present invention.

The above description serves to expound preferred embodiments of the present invention rather than limit the scope of application of the present invention. Persons skilled in the art should be able to make obvious changes or modification of the present invention without departing from the substantive disclosure of the present invention.

What is claimed is:

1. A method for simulating dark-part exposure compensation of high dynamic range images using a single image, comprising steps of:

obtaining an image P0;

performing bright-part-enhancing image processing on the image P0 to obtain an image P1 and further performing saturation-contrast-enhancing image processing on the image P0 to obtain an image P2;

selecting one of the image P1 and the image P2, performing bright and dark parts identifying image processing on the selected image selected from the image P1 and the image P2, performing blurring image processing on the selected image, so as to obtain a weight-reference image P3, wherein each of a plurality of pixel values of the weight-reference image P3 represents a weight; and performing mixed weight calculation on a plurality of pixels of the image P1 and a plurality of pixels of the image P2 according to a plurality of weights of a plurality of pixels of the weight-reference image P3, respectively, so as to mix the image P1 and the image P2 to obtain a mixed image P4, wherein the pixels of the images P1, P2 on which the mixed weight calculation is performed correspond to the pixels of the weight-reference image P3, respectively.

2. The method of claim 1, wherein the step of the bright-part-enhancing image processing is expressed by:

$$F(x) = \frac{\log\left(1.0 + \frac{x \div 255}{\Delta\varepsilon}\right)}{\log\left(1.0 + \frac{1.0}{\Delta\varepsilon}\right)} \times 255$$

wherein x denotes pixel values of the image P0 and ranges between 0 and 255, wherein $\Delta\varepsilon$ denotes a constant and ranges between 0.001 and 0.1.

3. The method of claim 1, wherein the step of the saturation-contrast-enhancing image processing is expressed by:

$$F(x)_{black\_enh} = x^{bias(x)*a}$$

$$\text{where } bias(x) = x^{\frac{\log(b)}{\log 0.5}}$$

a ranges between 4.0 and 6.0, and b ranges between 0.04 and 0.06 wherein x denotes pixel values of the image P0 and ranges between 0 and 255.

4. The method of claim 1, wherein the step of the bright and dark parts identifying image processing is expressed by:

$$F(x) = ax^3 + bx^2 + cx + d$$

wherein x denotes pixel values of the selected image and ranges between 0 and 255, and F(x) ranges between 0 and 255, wherein a, b and c are coefficients.

5. The method of claim 1, wherein the step of the blurring image processing is Gaussian blurring image processing.

6. The method of claim 1, wherein the step of the mixed weight calculation is Alpha channel mixing image processing.

7. An image processing device, comprising:

a first device for obtaining an image P0;

a second device for performing bright-part-enhancing image processing on the image P0 to obtain an image P1 and performing saturation-contrast-enhancing image processing on the image P0 to obtain an image P2;

a third device for selecting one of the image P1 and the image P2, performing bright and dark parts identifying image processing on a selected image selected from the image P1 and the image P2, performing blurring image processing on the selected image, so as to obtain a weight-reference image P3, wherein each of a plurality of pixel values of the weight-reference image P3 represents a weight; and a fourth device for performing mixed weight calculation on a plurality of pixels of the image P1 and a plurality of pixels of the image P2 according to a plurality of weights of a plurality of pixels of the weight-reference image P3, respectively, so as to mix the image P1 and the image P2 to obtain a mixed image P4, wherein the pixels of the images P1, P2 on which the mixed weight calculation is performed correspond to the pixels of the weight-reference image P3, respectively.

8. The image processing device of claim 7, wherein the bright-part-enhancing image processing is expressed by:

$$F(x) = \frac{\log\left(1.0 + \frac{x \div 255}{\Delta \varepsilon}\right)}{\log\left(1.0 + \frac{1.0}{\Delta \varepsilon}\right)} \times 255$$

wherein x denotes pixel values of the image P0 and ranges between 0 and 255, wherein $\Delta \varepsilon$ denotes a constant and ranges between 0.001 and 0.1.

9. The image processing device of claim 7, wherein the saturation-contrast-enhancing image processing is expressed by:

$$F(x)_{black\_enh} = x^{bias(x)*a}$$

where $bias(x) = x^{\frac{\log(b)}{\log 0.5}}$ a ranges between 4.0 and 6.0, and b ranges between 0.04 and 0.06 wherein x denotes pixel values of the image P0 and ranges between 0 and 255.

10. The image processing device of claim 7, wherein the bright and dark parts identifying image processing is expressed by:

$$F(x)=ax^3+bx^2+cx+d$$

wherein x denotes pixel values of the selected image and ranges between 0 and 255, and F(x) ranges between 0 and 255, wherein a, b and c are coefficients.

11. The image processing device of claim 7, wherein the blurring image processing is Gaussian blurring image processing.

12. The image processing device of claim 7, wherein the mixed weight calculation is Alpha channel mixing image processing.

13. An image processing device, comprising:
a memory for at least storing an image P0; and
a processor for performing image processing comprising steps of:

performing bright-part-enhancing image processing on the image P0 to obtain an image P1 and performing saturation-contrast-enhancing image processing on the image P0 to obtain an image P2;

selecting one of the image P1 and the image P2, performing bright and dark parts identifying image processing on a selected image selected from the image P1 and the image P2, performing blurring image processing on the selected image, so as to obtain a weight-reference image P3, wherein each of a plurality of pixel values of the weight-reference image P3 represents a weight; and performing mixed weight calculation on a plurality of pixels of the image P1 and a plurality of pixels of the image P2 according to a plurality of weights of a plurality of pixels of the weight-reference image P3, respectively, so as to mix the image P1 and the image P2 to obtain a mixed image P4, wherein the pixels of the images P1, P2 on which the mixed weight calculation is performed correspond to the pixels of the weight-reference image P3, respectively.

14. The image processing device of claim 13, wherein the bright-part-enhancing image processing is expressed by:

$$F(x) = \frac{\log\left(1.0 + \frac{x \div 255}{\Delta \varepsilon}\right)}{\log\left(1.0 + \frac{1.0}{\Delta \varepsilon}\right)} \times 255$$

wherein x denotes pixel values of the image P0 and ranges between 0 and 255, wherein $\Delta \varepsilon$ denotes a constant and ranges between 0.001 and 0.1.

15. The image processing device of claim 13, wherein the saturation-contrast-enhancing image processing is expressed by:

$$F(x)_{black\_enh} = x^{bias(x)*a}$$

where $bias(x) = x^{\frac{\log(b)}{\log 0.5}}$ a ranges between 4.0 and 6.0, and b ranges between 0.04 and 0.06 wherein x denotes pixel values of the image P0 and ranges between 0 and 255.

16. The image processing device of claim 13, wherein the bright and dark parts identifying image processing is expressed by:

$$F(x)=ax^3+bx^2+cx+d$$

wherein x denotes pixel values of the selected image and ranges between 0 and 255, and F(x) ranges between 0 and 255, wherein a, b and c are coefficients.

17. The image processing device of claim 13, wherein the blurring image processing is Gaussian blurring image processing.

18. The image processing device of claim 13, wherein the mixed weight calculation is Alpha channel mixing image processing.

* * * * *